INVENTOR.
ROBERT H. RAMP

ATTORNEY 3,179,951
LENS CLAMPING MECHANISM FOR
OPHTHALMIC MOUNTING
Robert H. Ramp, Pittsford, N.Y., assignor to Bausch &
Lomb Incorporated, Rochester, N.Y., a corporation of
New York
Filed Nov. 21, 1961, Ser. No. 153,847
7 Claims. (Cl. 351—91)

This invention relates to an ophthalmic mounting for lenses and more particularly it relates to the lens clamping mechanism therefor.

It is an object of this invention to provide a novel ophthalmic mounting for a pair of ophthalmic lenses, said mounting being sturdy and reliable in use and of neat appearance.

A further object of this invention is to provide such a device which involves no loose or complex parts and has a lens clamping mechanism of unusual simplicity and good mechanical alignment.

Another object of this invention is to provide an ophthalmic mounting as above outlined which may be assembled by workers having a minimum of training in this art and involving the use of a single clamping screw.

Figure 1:
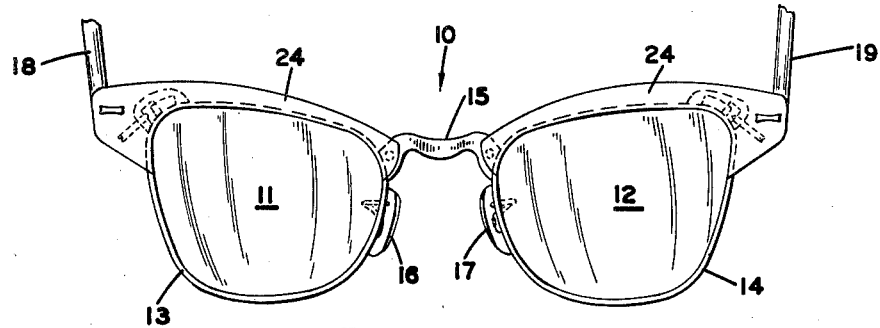
Figure 2:
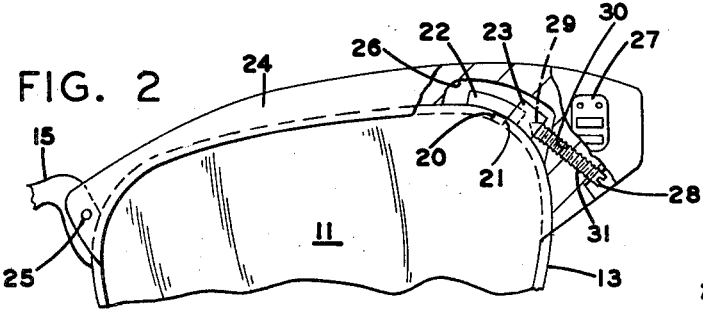
Figure 4:
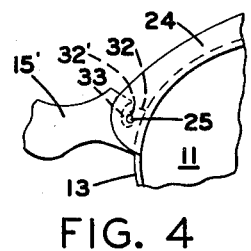
Figure 5:
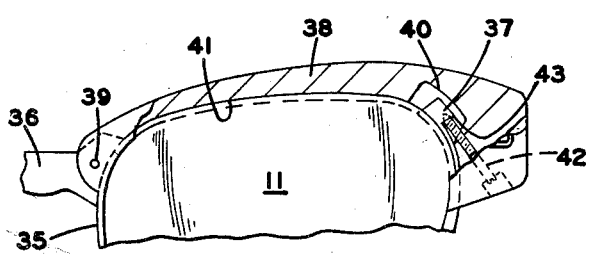
Figure 3:
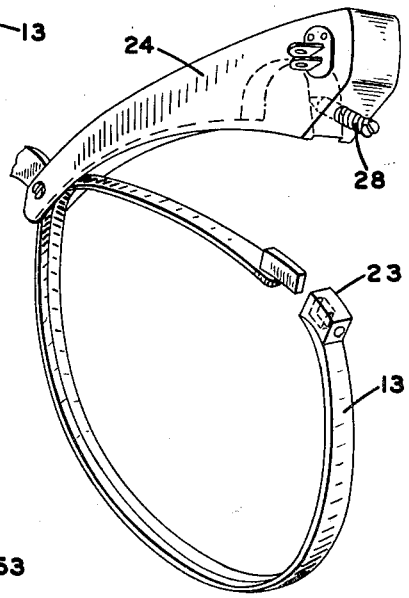
Figure 6:
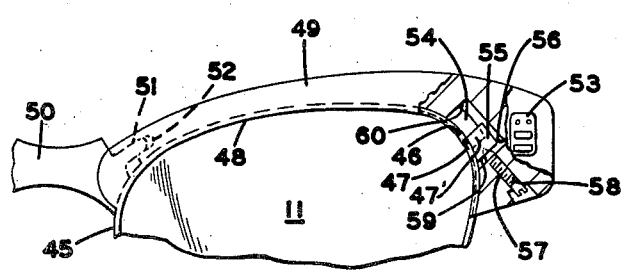

Further objects and advantages will be apparent to those skilled in the art by reference to the specification herebelow taken in connection with the accompanying drawing, wherein:

FIG. 1 is a front elevational view of an ophthalmic mounting embodying the present invention, FIG. 2 is an enlarged rear view of one side of said mounting shown in FIG. 1, parts thereof being broken away and shown in section, FIG. 3 is a perspective view in open position of one side of said ophthalmic mounting showing the lens disassembled, FIG. 4 is a fragmentary detailed showing of one form of attachment mechanism for a browpiece member, FIG. 5 is an enlarged rear view partly shown in section and broken away of another form of this invention, and FIG. 6 is a view similar to FIG. 5 of still another form of this invention.

In FIG. 1 of the drawing there is represented at 10 generally a preferred form of this invention wherein a pair of ophthalmic lenses 11 and 12 are mounted in lens rims 13 and 14 which are connected together permanently in the nasal parts by a bridge member 15. Next to the nasal parts of the lens rims 13 and 14, a pair of nose pads 16 and 17 are attached thereon and at the temporal sides of the eyewire a pair of temples 18 and 19 are hingedly attached in a well-known manner.

According to this invention the lens rims 13 and 14 are slit in the temporal parts thereof so that a space occurs between the opposite ends 20 and 21 of the lens rims. Bridging said space and aligning the ends 20 and 21 of the lens rim 13, there is provided a key 22 which is slidably engaged and fitted within a socket or abutment block 23, the key and socket being respectively fixed by soldering or otherwise onto the respective ends 20 and 21 of the eyewire 13. Overlying each of the lenses 11 and 12 is a browpiece 24 which is secured at its nasal part by suitable means such as the shear pin 25 onto the bridge member 15. At the temporal side of the browpiece 24, a recess 26 is formed so as to freely contain and enclose the key and socket mechanism which joins the ends 20 and 21 of the eyewire. Said browpiece 24 is extended over and around the temporal side of the eyewire 13 and a temple hinge 27 is mounted in any preferred manner thereon.

The principal feature of this invention relates to the means by which the ends 20 and 21 of the eyewire 13 are clamped together in alignment with each other. In all forms of this invention a clamping screw 28 is provided in the browpiece 24 and an accommodating recess 29 is provided in a radial surface 30 on said socket or abutment member 23 wherein the clamping screw 28 may engage for the purpose of clamping the lens 12. The browpiece 24 has formed therein a threaded opening 31 which is directed substantially normal to the abutment face 30 so that when the screw 28 is threaded therein, it will bear against the socket 23 and clamp the lens 11 within the lens rim 13.

It will be observed that the screw 28 not only acts as a clamping device but it also acts as a positioning element to secure the temporal side of the browpiece 24 in its assembled position on the lens rim 13.

Referring now to FIG. 4 of the drawing, a modification of the nasal anchorage for the browpiece 24 is shown wherein the shear pin 25 which traverses the end of the browpiece 24 is demountably anchored on the bridge member 15' by means of a hook 32 which is formed on said bridge member near lens rim 13. Said hook 32 as seen in FIG. 4 is formed with an outstanding locking surface 32' which is directed substantially normal to the adjacent part of the eyewire 13 so that the pin 25 may be lodged against it to hold the browpiece against a force tending to move it away from the bridge member. For demountably assembling the pin 25 against the hook 32, an open slot 33 of spiral configuration is formed in the adjacent edge of the bridge member 15', said slot having a reentrant part leading to the aforesaid locking surface 32' of the hook.

The preferred form of this invention is especially well illustrated in its disassembled position in FIG. 3 of the drawing which shows the browpiece 24 disengaged from the abutment block 23 and the lens 11 removed from the lens rim 13.

In FIG. 5 of the drawing a second form of this invention is illustrated wherein the ophthalmic mounting for the lens 11 comprises a lens rim 35 which is fixed to the bridge member 36 at one end, the other end thereof having an abutment block 37 fixedly mounted thereon so that the lens rim extends in this form of the invention from the bridge member 36 downwardly and around the nasal part of the mounting, underneath the lens 11 and upwardly of the temporal side of the lens so that the lens is only partially covered by the lens rim 35. Over the top of the lens 11 from its nasal side to the temporal side is provided a browpiece 38 which is secured in any preferred manner, such as by the pin 39, to the bridge member 36 on the nasal side and is secured at the other side in a manner similar to that shown in FIG. 2. Particularly, the construction of the second form of this invention comprises a free fitting recess 40 which is so formed in the temporal part of the browpiece 38 as to allow sliding motion of the abutment block 37 along the lens edge, the sides of the slot 40 being fitted traversely to the sides of the block 37 to support it. On the underside of the browpiece 38 a groove 41 is formed which accommodates the upper edge of the lens 11 between the ends of the lens rim 35. In detail the clamping mechanism in this case comprises a clamping screw 42 which is threaded into the temporal part of the browpiece 38 in such a direction as to enter the recess 40 and apply a force against the abutment wall 43 of the block 37.

It is here pointed out that in both of the above-described forms of this invention the clamping action of the screw against the abutment block on the end of the lens rim produces a stress or tension in the browpiece which is opposed by the anchor pin in the bridge member, so that the browpiece is in effect a stress transmitting member for carrying the clamping stress from the screw back through the brow member to the bridge member on which the lens rim is fixed.

In FIG. 6 a still further form of the invention is illustrated comprising a lens 11 having a lens rim 45 extending around its periphery. The lens rim 45 is split in the temporal part thereof forming opposed ends 46 and 47, the outer end 47 having an abutment block 47' formed thereon. Over the top edge of the lens 11, the overlying lens rim 45 is recessed at 48 into the browpiece 49 so as to enclose the same. The nasal end of the browpiece 49 is secured in close contact with the lens rim 45 but it is not held against relative longitudinal motion. The mechanism whereby this is accomplished comprises a bridge member 50, having formed on the surface facing the browpiece 49 a prong 51 which extends in spaced relation and parallel approximately to the adjacent part of the lens rim 45. An accommodating recess or slot 52 is provided for the prong 51 to which it is fitted, said recess being deeper than the length of the prong 51 so that slight relative motion therebetween may be obtained. The outer or temporal end of the browpiece 49 is provided with the usual hinge structure 53 of any desired form whereon the temple piece, not shown, is mounted.

For the purpose of aligning the opposite ends 46 and 47 of the lens rim 45, there is formed respectively a key 54 and a socket 55, said socket having an opening which is fitted thereto slidably in the same manner as shown in connection with FIG. 2. This key and socket mechanism is housed within a recess 56 formed in the underside of browpiece 49 so as to enclose and conceal said connection.

In order to tightly clamp the end 47 of the lens rim 45 against the lens 11 so as to meet the end 46, a clamping screw 57 is provided which is engaged within a corresponding threaded opening 58 in the temporal part of the browpiece 49. The direction of the clamping screw 57 is so arranged that it enters the temporal side of the recess 56 and engages within a seating recess formed in the abutment surface 59 so as to move the abutment member 55. The recess 56 is provided at its opposite end with an opposed abutment surface 60 which is located in abutting relation with the squared inner end of the key 54 so that when pressure is applied by the clamping screw 57, the resulting clamping pressure is transmitted to the abutment member 55 and this pressure is carried around the lens rim 45 to the opposite end of the key 54 which then is forced against the wall 60 so that the space between the ends 46 and 47 of the lens rim is reduced.

The advantage of this particular construction is that the area of the browpiece which is placed in tension by the clamping force is comparatively short and said area is only slightly greater in length than the total length of the recess 56.

When assembling a mounting which is constructed according to this invention, the lens is placed in the lens rim when the mounting is in a position such as illustrated in FIG. 3. Thereafter it is only necessary to hold the loose end of the lens rim 13 against the lens until the browpiece can be pivoted downwardly to assume the assembled position shown in FIG. 2 whereupon the clamping screw 28 is tightened to clamp the lens ends together and secure the browpiece in fully assembled position.

It will be seen from the foregoing specification that there is here provided a relatively simple ophthalmic mounting which is extremely easy to assemble since the uniting parts are initially well aligned for assembling together. It is further pointed out that no loose screws, bolts or rivets are necessary in changing lenses and the entire mounting is well designed to prevent damage due to inferior or unskilled operation or due to foreign matter or grit.

Although only a selected number of forms of this invention have been shown and described in detail, other forms are possible and changes may be made in the details and the arrangement of the parts thereof and substitutions may be made therein without departing from the spirit of the invention as defined in the claims appended below.

I claim:

1. An ophthalmic mounting for a pair of lenses comprising a bridge member, a lens rim fixed thereto and extending at least partially around the periphery of one of said lenses, the opposite ends of said rim being spaced from and aligned with each other along a lens edge and one of said ends being movably located on the temporal side of the lens so as to clamp the lens, a stress transmitting member extending along the upper edge of said lens, means for securing the member at one end thereof on said bridge, a reentrant wall defining the outline shape of a recess which is indented into the inner edge of the temporal end of said stress transmitting member for housing said movable end, a solid anchorage portion of said stress transmitting member located between said wall and the rim contacting temporal end of the member, abutment means formed on said movable end and having an abutment face thereon directed substantially radially of said lens, a clamping screw threadably engaged in said anchorage portion and extending through said recess wall in a direction such that the end of the screw forcibly abuts against said face so as to force said rim into tight engagement with said lens and simultaneously force said lens and rim against said member, the first said means serving as reaction means for holding said member stationary in opposition to the clamping force.

2. An ophthalmic mounting for a pair of lenses comprising a bridge member, a lens rim fixed thereto and extending around the periphery of one of said lenses, the opposite ends of said rim being spaced apart and held in alignment with each other along a lens edge and being located on the temporal side of said rim, one of said ends being movable to tighten the rim around the lens, a force transmitting browpiece extending along the upper edge of said lens and secured at one end to said bridge, the temporal end thereof overlying and enclosing said movable end of the lens rim, an abutment block formed on said movable end and having a face thereon directed substantially radially of said lens, a reentrant wall defining an open recess extending along the rim contacting portion of the temporal side of said browpiece so as to contain said block, said wall having a radial portion spaced inwardly along said rim from the temporal end of the browpiece so as to interpose a solid anchorage portion therebetween, a clamping screw threaded through said anchorage portion and directed through said radial wall portion substantially normal to said face and forcibly engaging said face so as to force the movable end into tight engagement with said lens and simultaneously force the lens and its rim against said browpiece.

3. An ophthalmic mounting as set forth in claim 2 further characterized by alignment means cooperatively constructed on said opposite ends of the rims to operatively align said ends.

4. An ophthalmic mounting for a pair of lenses comprising a bridge member, a lens rim fixed thereto and extending around the periphery of one of said lenses, the rim being split in its temporal portion and the ends thereof being spaced apart, a socket and a key slidably fitted therein for aligning said ends, the socket and key being formed respectively on said ends with the socket located farthest from said bridge and having an abutment surface formed thereon, a browpiece extending over and around the upper and temporal portions of said rim, a reentrant wall formed in said browpiece so as to define the outline of an indented recess which contains said socket and key, a solid anchorage portion located between said wall and the adjacent end of said browpiece, a clamping screw threaded through said anchorage portion and directed against said abutment surface in a direction to effect clamping of the rim around the lens and press the lens toward said browpiece whereby tension is induced in said browpiece to hold the lens assembled in its rim, and reaction means formed cooperatively on the bridge member and adjacent end of the browpiece for holding said browpiece stationary in opposition to the clamping force.

5. An ophthalmic mounting as set forth in claim 1 wherein said stress transmitting member is anchored demountably to said bridge member, said securing means including a pin traversing the nasal end of said stress transmitting member and further comprising a locking hook which projects outwardly substantially normal to the adjacent part of said lens rim, said pin engaging said hook to prevent motion of the browpiece toward the temple end thereof.

6. An ophthalmic mounting for a pair of lenses comprising a bridge member, a lens rim fixed to the member and extending around the periphery of one of said lenses, the opposite ends of said rim being spaced apart and being located on the temporal side of said rim, one of the ends being movable to tighten the rim around the lens, a browpiece extending along the upper edge of said lens and over and around the temporal part of said rim, a prong formed on said bridge member so as to extend substantially parallel with and spaced from said rim, a sliding connection formed on the nasal end of said browpiece cooperatively with said prong for retaining said end, a slidably interfitting key and socket connection formed cooperatively on said opposite ends of said rim to mutually align said ends, said connection being enclosed within a recess in said browpiece, a pair of walls formed at opposite ends of said recess, a pair of substantially radial surfaces formed respectively on said key and socket adjacent to and spaced from said walls, a solid anchorage portion formed on the browpiece between one of said pair of walls and the end of the rim contacting element of the browpiece, and a clamping screw threaded through said anchorage portion and extending through said one wall so as to bear against one of said surfaces and force the other surface against the other of said walls whereby a clamping force is provided to clamp the lens rim against the lens and against said browpiece when the screw is tightened.

7. A spectacle frame comprising a bridge member, a pair of lens rims fixed to the opposite ends of said member for mounting a pair of lenses, each of said rims extending from the bridge member downwardly and around the lower part of each lens and terminating at the other end thereof in the temporal portion of the frame, a browpiece extending over the top and temporal parts of the lens and having a lens seating surface formed therein for receiving the upper edge of one of said lenses, means for securing the nasal end of the browpiece to said bridge member, an abutment block fixed on said other end of the lens rim, said block having an abutment surface formed thereon substantially radially of said lens, a reentrant wall formed in the inner side of said browpiece freely around said block and defining a recess which contains the block, a solid anchorage portion formed between said wall and the rim contacting end element of said browpiece, and a clamping screw threaded through said anchorage portion and directed through said wall in a position to bear directly against said abutment surface whereby the screw forces said other end of the rim into tight engagement with said lens and force the edge of the lens against said lens seating surface while subjecting said browpiece to a tensile force.

References Cited by the Examiner
UNITED STATES PATENTS 2,659,269 11/53 Castelli _____ 88—47
2,711,671 6/55 Cook _____ 88—47

FOREIGN PATENTS 671,693 6/55 Great Britain.
1,125,968 7/56 France.
1,175,145 11/58 France.

JEWELL H. PEDERSEN, *Primary Examiner.*

WILLIAM MISIEK, *Examiner.*